United States Patent
Niewiadomski et al.

(10) Patent No.: US 10,479,152 B2
(45) Date of Patent: Nov. 19, 2019

(54) COMPENSATION FOR TRAILER COUPLER HEIGHT IN AUTOMATIC HITCH OPERATION

(71) Applicant: Ford Global Technologies, LLC, Dearborn, MI (US)

(72) Inventors: Luke Niewiadomski, Hamtramck, MI (US); Chen Zhang, Canton, MI (US); Joseph F. Stanek, Northville, MI (US); George Edmund Walley, III, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 132 days.

(21) Appl. No.: 15/802,831

(22) Filed: Nov. 3, 2017

(65) Prior Publication Data
US 2019/0135059 A1    May 9, 2019

(51) Int. Cl.
| *B60D 1/36* | (2006.01) |
| *B60D 1/06* | (2006.01) |
| *B60R 1/00* | (2006.01) |
| *B62D 15/02* | (2006.01) |
| *B60D 1/62* | (2006.01) |

(52) U.S. Cl.
CPC .............. *B60D 1/366* (2013.01); *B60D 1/06* (2013.01); *B60D 1/36* (2013.01); *B60D 1/62* (2013.01); *B60R 1/00* (2013.01); *B60R 1/003* (2013.01); *B62D 15/026* (2013.01); *B62D 15/028* (2013.01); *B62D 15/0285* (2013.01); *B60R 2300/808* (2013.01)

(58) Field of Classification Search
CPC ............ B60R 1/003; B60D 1/36; B60D 1/366
See application file for complete search history.

(56) References Cited

U.S. PATENT DOCUMENTS

| 6,756,607 | B2 * | 6/2004 | Yamashita | .............. H01L 22/14 |
| | | | | 257/48 |
| 8,038,166 | B1 | 10/2011 | Piesinger | |
| 9,434,381 | B2 | 9/2016 | Windeler | |
| 9,499,018 | B2 * | 11/2016 | Gehrke | ..................... B60D 1/36 |
| 9,696,723 | B2 * | 7/2017 | Zeng | ..................... G05D 1/0246 |
| 9,889,714 | B2 * | 2/2018 | Bochenek | ................ B60D 1/36 |
| 2005/0074143 | A1 | 4/2005 | Kawai | |
| 2010/0096203 | A1 | 4/2010 | Freese V et al. | |
| 2013/0226390 | A1 * | 8/2013 | Luo | .......................... B60D 1/36 |
| | | | | 701/25 |
| 2014/0012465 | A1 | 1/2014 | Shank et al. | |
| 2016/0052548 | A1 | 2/2016 | Singh et al. | |
| 2016/0304122 | A1 * | 10/2016 | Herzog | .................... B60D 1/36 |
| 2018/0081370 | A1 * | 3/2018 | Miller | ................... B60W 10/04 |
| 2018/0251153 | A1 * | 9/2018 | Li | .......................... B62D 13/06 |

FOREIGN PATENT DOCUMENTS

WO    WO-2018055321 A2 *    3/2018    ............... B60D 1/06

\* cited by examiner

*Primary Examiner* — Joseph M Rocca
*Assistant Examiner* — Harold Eric Pahlck, III
(74) *Attorney, Agent, or Firm* — Raymond Coppiellie; Price Heneveld LLP

(57) ABSTRACT

A vehicle hitch assistance system includes a controller acquiring position data of a coupler of a trailer and deriving a vehicle path to align a hitch ball of the vehicle with the coupler including compensating for a determined change in the position of the coupler in a driving direction related to a difference between a vertical position of the coupler in the position data and a height of the hitch ball.

19 Claims, 9 Drawing Sheets

COMPENSATION FOR TRAILER COUPLER HEIGHT IN AUTOMATIC HITCH OPERATION

FIELD OF THE DISCLOSURE

The present disclosure generally relates to a system for assisting in a vehicle-trailer hitching operation. In particular, the present system compensates for horizontal movement of a coupler during lowering thereof onto a hitch ball.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a vehicle hitch assistance system includes a controller acquiring position data of a coupler of a trailer and deriving a vehicle path to align a hitch ball of the vehicle with the coupler including compensating for a determined change in the position of the coupler in a driving direction related to a difference between a vertical position of the coupler in the position data and a height of the hitch ball.

Embodiments of the first aspect of the invention can include any one or a combination of the following features:
  the system further includes means for acquiring the data including a position of the coupler of the trailer;
  the means for acquiring include one or more cameras mounted on the vehicle;
  the controller determines a delta in the position of the coupler in the vertical direction to align with the hitch ball of the vehicle;
  the driving direction is on a plane generally normal to the vertical direction;
  the controller compensates for the change in the position of the coupler in the driving direction based on the position data related to the vertical position of the coupler by relating the change in position of the coupler in the vertical direction to the change in the position of the coupler in the driving direction as a matter of rotation of the coupler about an axis;
  the axis is vertically aligned with a single axle of the trailer;
  relating the change in position of the coupler in the vertical direction to the change in the position of the coupler in the driving direction as a matter of rotation of the coupler about the axis is based on stored information including a distance between the coupler and the axis;
  the controller obtains the information including a distance between the coupler and the axis by user input;
  the controller estimates the distance between the coupler and the axis based on measured dynamics during driving when the vehicle is coupled with the trailer; and
  the distance between the coupler and the axis is stored as a general estimate.

According to another aspect of the present disclosure, a vehicle includes a hitch ball mounted on an exterior of the vehicle and a controller. The controller acquires position data of a coupler of a trailer and derives a vehicle path to align the hitch ball with the coupler, including compensating for a determined change in the a position of the coupler in a driving direction related to a difference between a vertical position of the coupler in the position data and a height of the hitch ball.

According to another aspect of the present disclosure, a method for assisting a vehicle in hitching with a trailer includes acquiring position data of a coupler of a trailer and deriving a vehicle path to align a hitch ball of the vehicle with the coupler including compensating for a determined change in the position of the coupler in a driving direction related to a difference between a vertical position of the coupler in the position data and a height of the hitch ball.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
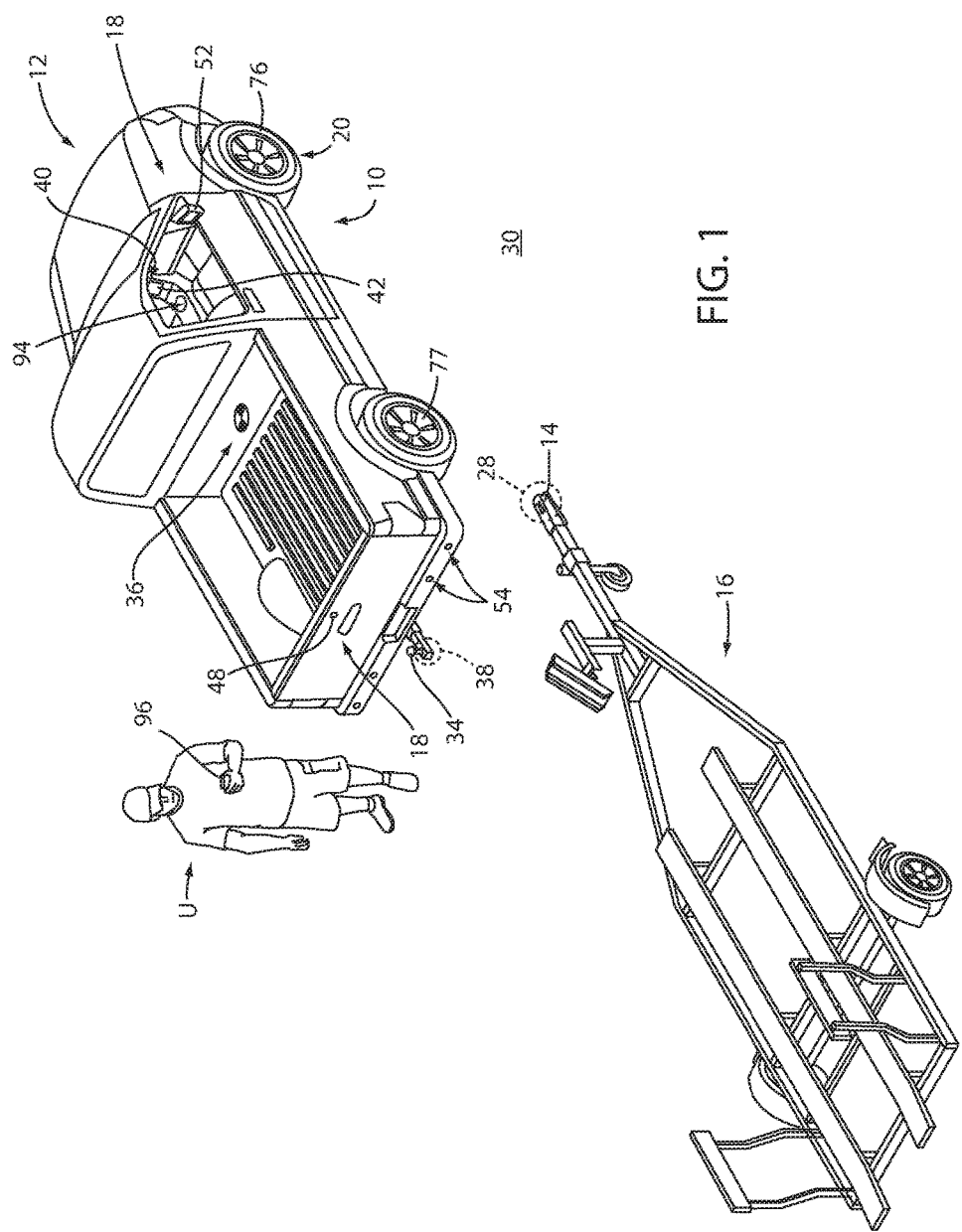
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-11, reference numeral 10 designates a hitch assistance system (also referred to as a "hitch assist" system) for a vehicle 12. In particular, hitch assistance system 10 includes a controller 26 acquiring position data of a coupler 14 of a trailer 16 and deriving a vehicle path 32 to align a hitch ball 34 of the vehicle 12 with the coupler 14. Deriving the vehicle path 32 includes compensating for a determined change in the position 28 of the coupler 14 in a driving direction related to a difference between a vertical position 28 of the coupler 14 in the position data and a height of the hitch ball 34.

Figure 2:
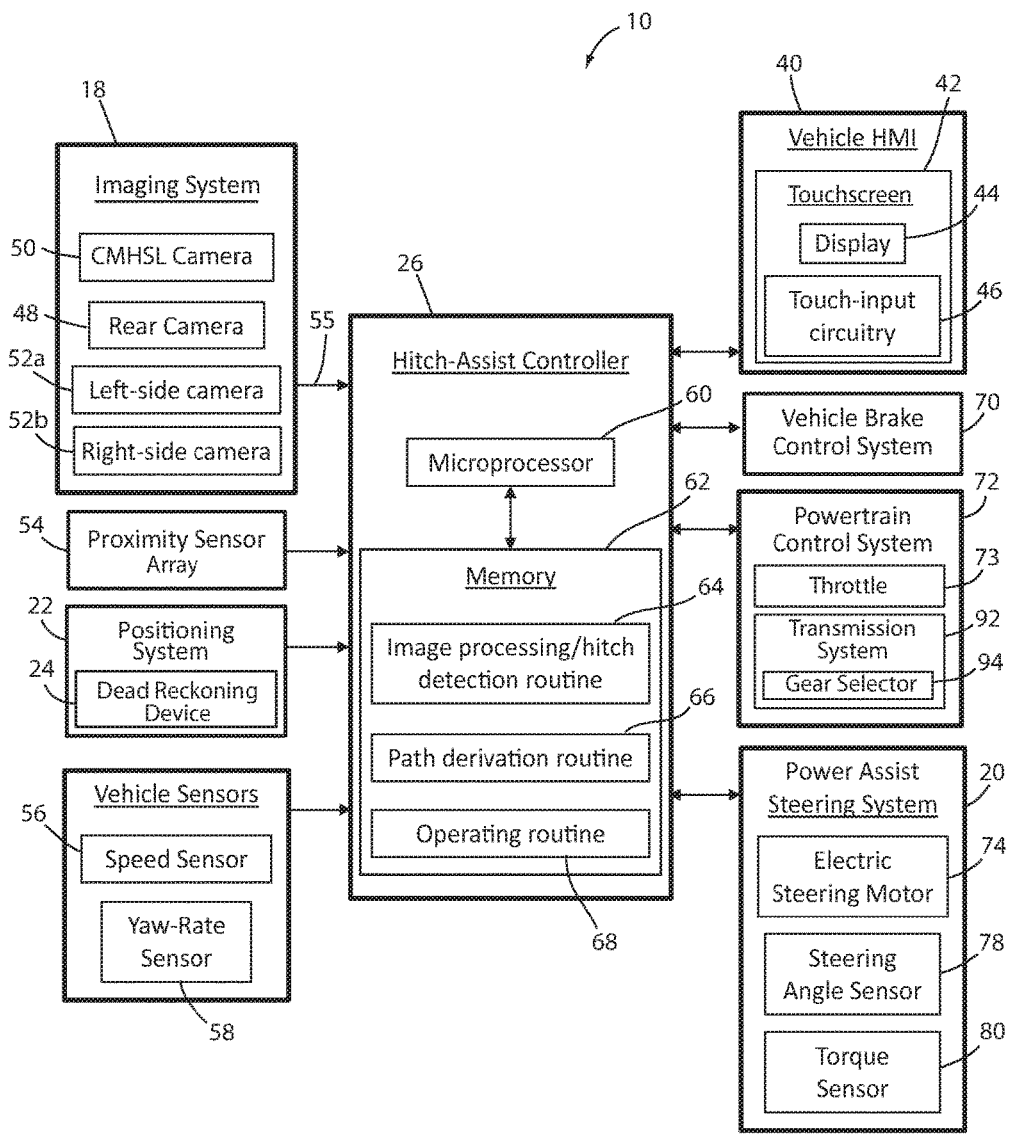
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position (e.g., based on the distance $D_h$ and angle $α_h$) of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
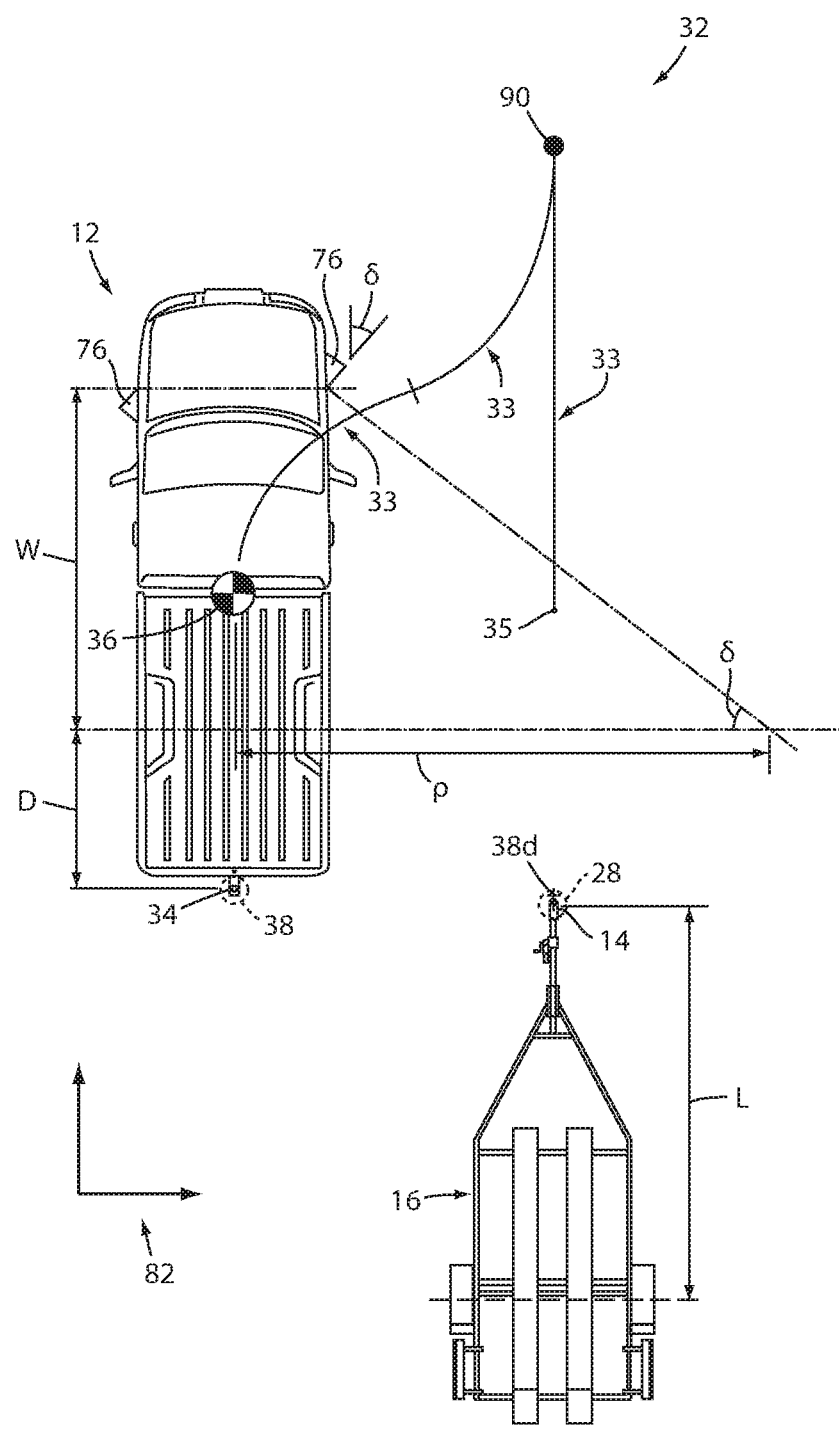
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate γ, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing 64 routine and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CMHSL) camera 50, and side-view cameras 52*a* and 52*b*, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52*a*, 52*b* included in imaging system 18 can be positioned to generally overlap in their respective fields of view, which in the depicted arrangement include fields of view 49, 51, 53*a*, and 53*b* to correspond with rear camera 48, center high-mount stop light (CMHSL) camera 50, and side-view cameras 52*a* and 52*b*, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53*a*, 53*b*, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52*a*, and 52*b* within imaging system 18. In either example, the image processing routine 64 can include information related to the positioning of any cameras 48, 50, 52*a*, and 52*b* present on vehicle 12 or utilized by system 10, including relative to the center 36 (FIG. 1) of vehicle 12, for example such that the positions of cameras 48, 50, 52*a*, and 52*b* relative to center 36 and/or to each other can be used for object positioning calculations and to result in object position data relative to the center 36 of vehicle 12, for example, or other features of vehicle 12, such as hitch ball 34 (FIG. 1), with known positions relative to center 36.

As discussed further, below, the height $H_b$ (or a vertical component of the data including the location) of hitch ball 34 can be used in connection with the determined height $H_c$ of coupler 14 to determine a desired endpoint 35 of vehicle path 32 for proper alignment between hitch ball 34 and coupler 14 when coupler 14 is lowered into a position level with (and, accordingly, engaged with) hitch ball 34.

The image processing routine 64 can be specifically programmed or otherwise configured to locate coupler 14 within image data 55. In one example, the image processing routine 64 can identify the coupler 14 within the image data 55 based on stored or otherwise known visual characteristics of coupler 14 or hitches in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the location 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55. Alternatively, the user can visually determine the position 28 of coupler 14 14 within an image presented on HMI 40 and can provide a touch input coupler 14 in a manner similar to that which is described in co-pending, commonly-assigned U.S. patent application Ser. No. 15/583,014, the entire disclosure of which is incorporated by reference herein. The image processing routine 64 can then correlate the location of the touch input with the coordinate system 82 applied to image 30.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. In the example shown, an initial position of vehicle 12 relative to trailer 16 may be such that coupler 14 is only in the field of view 53a of side camera 52a, with vehicle 12 being positioned laterally from trailer 16 but with coupler 14 being almost longitudinally aligned with hitch ball 34. In this manner, upon initiation of hitch assist system 10, such as by user input on touchscreen 42, for example, image processing routine 64 can identify coupler 14 within the image data 55 of camera 52a and estimate the position 28 of coupler 14 14 relative to hitch ball 34 using the image data 55 in accordance with one of the example discussed above (or a combination of the two examples) or by other known means, including by receiving focal length information within image data 55 to determine a distance $D_c$ to coupler 14 and an angle $\alpha_c$ of offset between coupler 14 and the longitudinal axis of vehicle 12. This information can then be used in light of the position 28 of coupler 14 within the field of view of the image data 55 to determine or estimate the height $H_c$ of coupler 14. Once the positioning $D_c$, $\alpha_c$ of coupler 14 has been determined and, optionally, confirmed by the user, controller 26 can take control of at least the vehicle steering system 20 to control the movement of vehicle 12 along the desired path 32 to align the vehicle hitch ball 34 with coupler 14.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as the drawbar length L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta}, \quad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \quad (2)$$

Path derivation routine 66 can be programmed to derive vehicle path 32 to align a known location of the vehicle hitch ball 34 with the estimated position 28 of coupler 14 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14.

Figure 4:
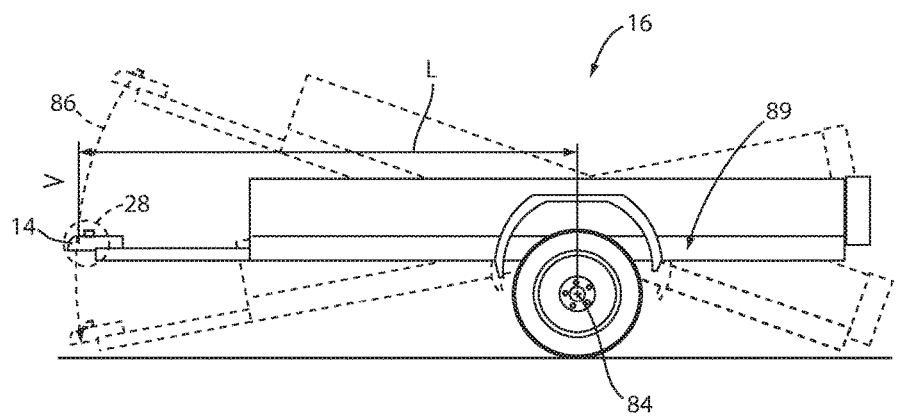
FIG. 4 is a side schematic view showing the trajectory of a trailer coupler during pivoting of the trailer about a point.
Figure 5:
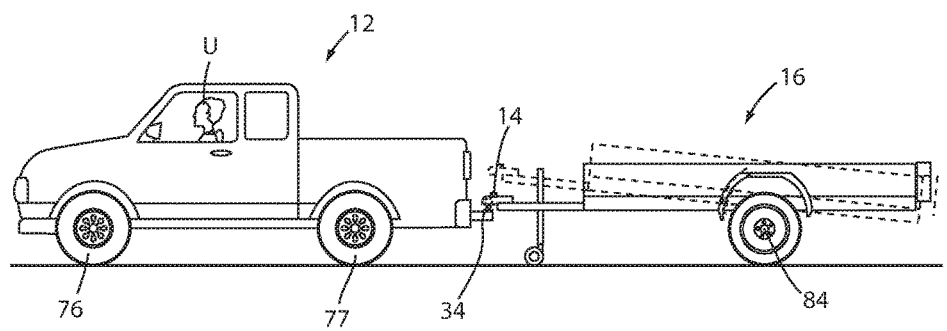
FIG. 5 is a side view showing a vehicle in a hitching operation with a trailer requiring downward movement of the trailer coupler.
Figure 6:
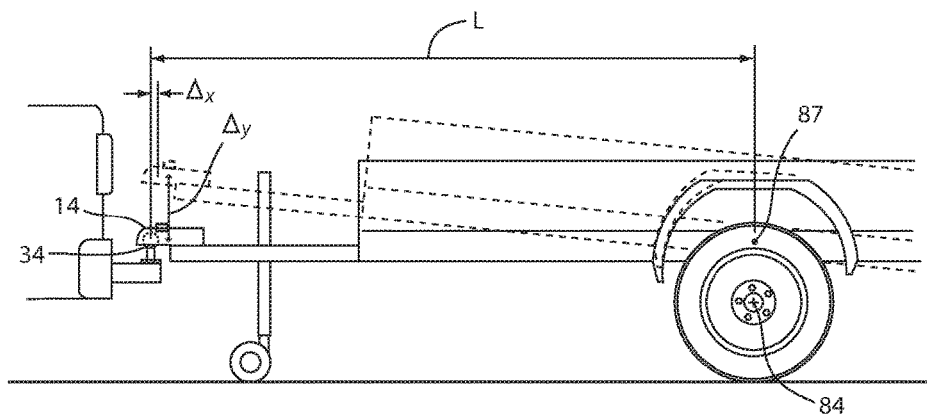
FIG. 6 is a detail view showing the horizontal offset in coupler position resulting from downward movement of the coupler to hitch with a vehicle.

As discussed above, path derivation routine 66 can determine the endpoint 35 of path 32 to achieve alignment between hitch ball 34 and coupler 14. In this manner, as shown in FIGS. 4-6, the position 28 of coupler 14 in what is referred to herein as a "driving direction", which is a direction generally parallel with the ground surface on which vehicle 12 is positioned (i.e. perpendicular to the vertical direction). In particular, in the single-axle trailer 16 shown in FIGS. 4-6, the coupler 14 may move in a horizontal direction toward and away from the axle 84 as coupler 14 rotates about the axle 84. In this manner, the horizontal and vertical movements of coupler 14 are directional components of the overall rotational movement of coupler 14 about axle 84 and along an trajectory 86, which as shown takes the form of an arced path about axle 84. Accordingly, when vehicle 12 is reversed toward trailer 16, an endpoint 35 of vehicle path 32 resulting in hitch ball 34 being aligned vertically with coupler 14, an elevated position 28 of coupler 14 would result in misalignment between coupler 14 and hitch ball 34 when coupler 14 is lowered into a horizontally-aligned position with hitch ball 34. Because such horizontal alignment is needed to receive hitch ball 34 within coupler 14 for coupling of vehicle 12 with trailer 16, such misalignment is undesirable. In this manner, hitch assist system 10 can compensate for horizontal movement $\Delta x$ of coupler 14 in a driving direction away from axle 84 by determining the movement of coupler 14 in the vertical direction $\Delta y$ that will be needed to receive hitch ball 34 within coupler 14.

As discussed above, hitch assist system 10 can provide image data 55 to image processing routine 64 that can be used by image processing routine 64 (by the process described above or by other available processes) to determine the height $H_b$ of hitch ball 34 (i.e. a vertical component of the data including the position 28 of coupler 14. Further, hitch assist system 10 can have stored in memory 62 or can otherwise determine the height $H_b$ of hitch ball 34. In one example, during an initial setup routine for hitch assist system 10, a user can be prompted to install hitch ball 34 by way of assembling a ball mount including hitch ball 34 with a receiver positioned on the rear of vehicle 12. The user can then be asked to measure the height $H_b$ of the hitch ball 34

Figure 8:
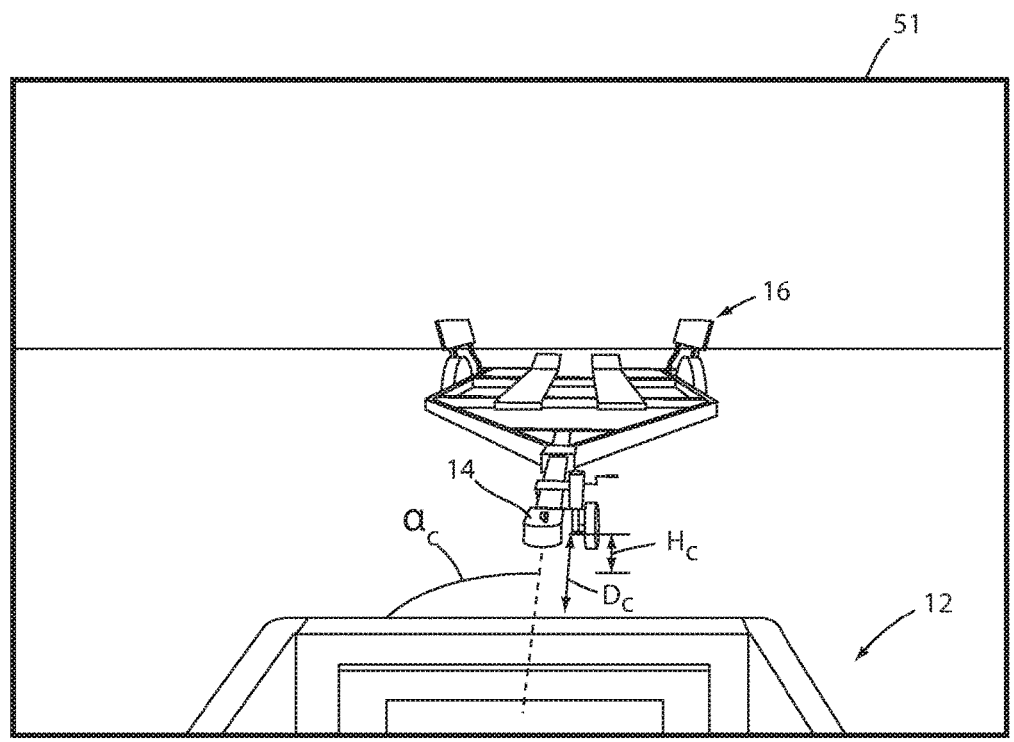
FIG. 8 is a depiction of an image received from a vehicle camera during the alignment sequence step of FIG. 7.

(such as to the top or center thereof) and to enter that measurement into memory 62 by way of HMI 40, for example. In this manner, a number of different height measurements for a plurality of hitch balls 34 used in connection with the particular vehicle 12 can be stored in memory 62 and can be selected by the user. In another example, hitch ball 34 may be within the field of view 49 of rear camera 48, as shown in FIG. 8, such that image data 55 can be processed to determine the height $H_b$ of hitch ball 34 on a real-time or on-demand basis.

As shown in FIG. 6, a strategy for determining an endpoint 35 for vehicle path 32 that places hitch ball 34 in a desired position $38_d$ for alignment with coupler 14 given the vertical component of the position 28 of coupler 14 involves calculating the actual or an approximate trajectory 86 for movement of coupler 14 about axle 84. Endpoint 35 is then derived, as discussed above or otherwise, to place hitch ball 34 at the desired location $38_d$ on that trajectory 86. In effect, such a scheme is implemented by determining the difference between the height $H_c$ of coupler 14 and the height $H_b$ of hitch ball 34, which represents the vertical distance $\Delta y$ by which coupler 14 will be lowered to engage with hitch ball 34. The determined trajectory 86 is then used to relate the vertical distance $\Delta y$ with a corresponding horizontal distance $\Delta x$ of coupler 14 movement in the driving direction that results from the vertical distance $\Delta y$. This horizontal distance $\Delta x$ can be input directly into path derivation routine 66 as a desired endpoint 35 thereof or can be applied as an offset to an endpoint 35 derived from the initially determined position 28 of coupler 14 when path 32 ends with a straight-backing segment 33, as illustrated in FIG. 3.

Continuing with reference to FIG. 6, a generally accurate estimation for trajectory 86 can be made in a simplified manner by assuming that coupler 14 pivots about a point 87 that is at the same height as the height $H_b$ of hitch ball 34. In this manner, the height of axle 84 does not need to be known. In this manner, the trajectory 86 can be determined as an arc with a radius corresponding to the drawbar length L of the trailer 16, which is the horizontal distance between coupler 14 and pivot point 87, such an arc being centered about pivot point 87. Accordingly, hitch assist system 10 must utilize some value for the drawbar length L. In one implementation, the drawbar length L can be a constant value stored in memory 62 that generally corresponds with an average of a determined typical trailer length for use with the particular type of vehicle 12, which may give an acceptable calculation of trajectory 86. In another implementation, a set of different drawbar lengths L can be stored in memory 62 and can correspond with different average lengths for various trailer types (e.g., boat, utility, recreational vehicle, or the like) that can be selected by the user or determined by image processing routine 64. Still further, various related vehicle systems, including various implementations of a trailer backup assistance system can provide a simplified user interface to control a vehicle 12 during reversing of a trailer 16, such as that which is described in U.S. patent application Ser. No. 14/736,391, the entire disclosure of which is hereby incorporated by reference herein. Hitch assist system 10 can be included in a vehicle having such an additional system or related capability such that a value obtained for drawbar length L by operation of the trailer backup assist system can be used by hitch assist system 10 in determining trajectory 86. In a particular aspect, hitch assist system 10 may include one or more of the above-described average drawbar lengths L stored in memory 62 as default settings, allowing hitch assist system 10 to operate without requiring a measurement, entered or derived, for drawbar length L, while allowing use of a specific value, when entered or available.

Given a particular value for drawbar length L, hitch assist system 10 can use the determination of the vertical component of the location 28 of coupler 14, corresponding with the height $H_c$ of coupler 14, as well as the height $H_b$ of hitch ball 34 to derive a value for the vertical movement $\Delta y$ of coupler 14 used to determine the adjustment offset $\Delta x$ for endpoint 35 of path 32. In a case where the trailer 16 is assumed to be a two-wheeled single axle trailer 16 (as shown in FIGS. 4-6), the trailer pivot point 87 can be assumed to be level with the hitch ball 34, when the trailer 16 is coupled with vehicle 12, the floor 89 of trailer 16 is parallel to the ground, and the coupler 14 does not raise or lower independently of the rest of trailer 16 (and is only raised by rotation about pivot point 87), the following equation can be used to determine the adjustment offset $\Delta x$:

$$\Delta x = L - \sqrt{L^2 - \Delta y^2} \qquad (3)$$

In instances when any of the above assumptions cannot be made, such as by when the geometry of the actual trailer 16 varies from the geometry relating to the assumed conditions, the endpoint 35 of path 32 derived using the determined offset $\Delta x$ may not be accurate enough to align coupler 14 with hitch ball 34 when coupler 14 is lowered toward hitch ball 34. Hitch assist system 10 may be configured to allow for compensation of such variations. For example, equation (3) can be modified to allow for an input of the height of axle 84 so that trajectory 86 can be positioned about axle 84 to compensate for the pivot point 87 being horizontally unaligned with hitch ball 34. Further, any difference between hitch ball 34 and pivot point 87 can be used to determine an angle of floor 89 that is non-zero when coupler 14 and hitch ball 34 are engaged. Alternatively, a measurement of such angle can be input and used in a modified version of equation (3) and to determine the height of pivot point 87.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle $\delta$, as dictated by path 32, depending on the position of vehicle 12 therealong. It is additionally noted that in an embodiment, the path 32 may comprise a progression of steering angle $\delta$ adjustment that is dependent on the tracked vehicle position.

As illustrated in FIG. 3, the initial positioning of trailer 16 relative to vehicle 12 may be such that forward movement of vehicle 12 is needed within a desired vehicle path 32, such as when trailer 16 is located laterally to the side of vehicle 12. In this manner, path 32 may include various segments 33 that require forward driving or rearward driving of vehicle 12 separated by inflection points 90 at which vehicle 12 must transition between such forward and rearward driving. In an embodiment, path derivation routine 66 can be configured to include a straight backing segment 33 for a defined distance before reaching the point at which hitch ball 34 is aligned with position 28 of coupler 14. The remaining segments 33 can be determined to achieve the needed lateral and forward/ backward movement within the smallest area possible and/or with the lowest number of overall segments 33 or inflection points 90. In the illustrated example of FIG. 3, path 32 can include two segments 33 that collectively traverse the needed lateral movement of vehicle 12, while providing a segment 33 of straight, rearward backing to bring hitch ball 34 into the above-described offset alignment with coupler 14, one of which includes forward driving with a maximum steering angle $\delta_{max}$ in the rightward-turning direction and the other including forward driving with a maximum steering angle $\delta_{max}$ in the leftward-turning direction. Subsequently, a single inflection point 90 is included in which vehicle 12 transitions from forward driving to rearward driving followed by the previously-mentioned straight rearward backing segment 33. It is noted that variations in the depicted path 32 may be used, including a variation with a single forward-driving segment 33 at a rightward steering angle δ less than the maximum steering angle $\delta_{max}$, followed by an inflection point 90 and a rearward driving segment 33 at a maximum leftward steering angle $\delta_{max}$ with a shorter straight backing segment 33, with still further paths 32 being possible. In another example, system 10 may be configured to operate with vehicle 12 in reverse only, in which case, system 10 can prompt the driver to drive vehicle 12, as needed, to position trailer 16 in a designated area relative to vehicle 12, including to the rear thereof so that path derivation routine 66 can determine a vehicle path 32 that includes only reverse driving. Such instructions can further prompt the driver to position vehicle 12 relative to trailer 16 to compensate for other limitations of system 10, including a particular distance for identification of coupler 14, a minimum offset angle $\alpha_c$, or the like. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above.

Figure 7:
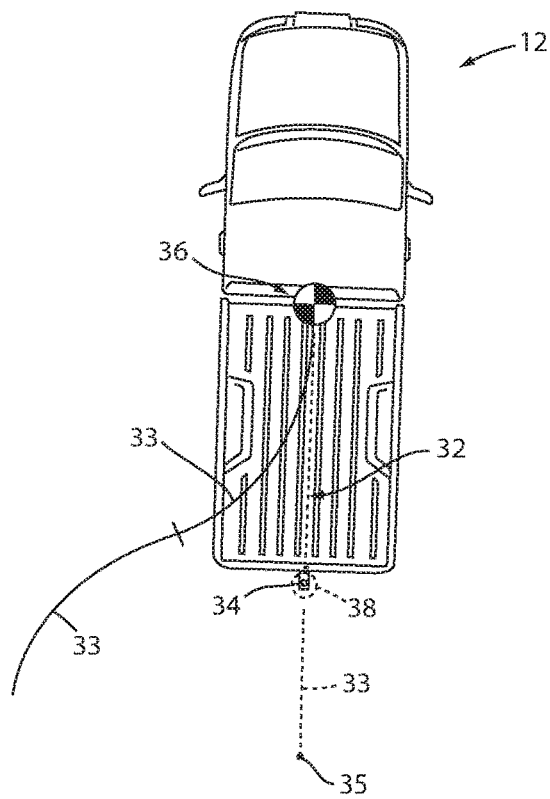
FIG. 7 is an overhead schematic view of the vehicle during a subsequent step of the alignment sequence with the trailer.
Figure 7:
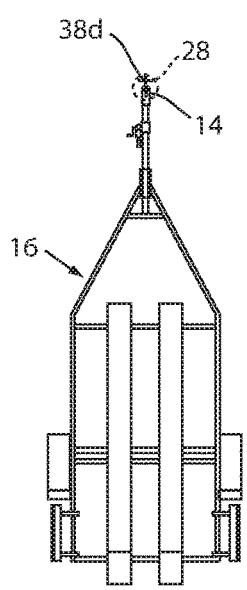
Figure 9:
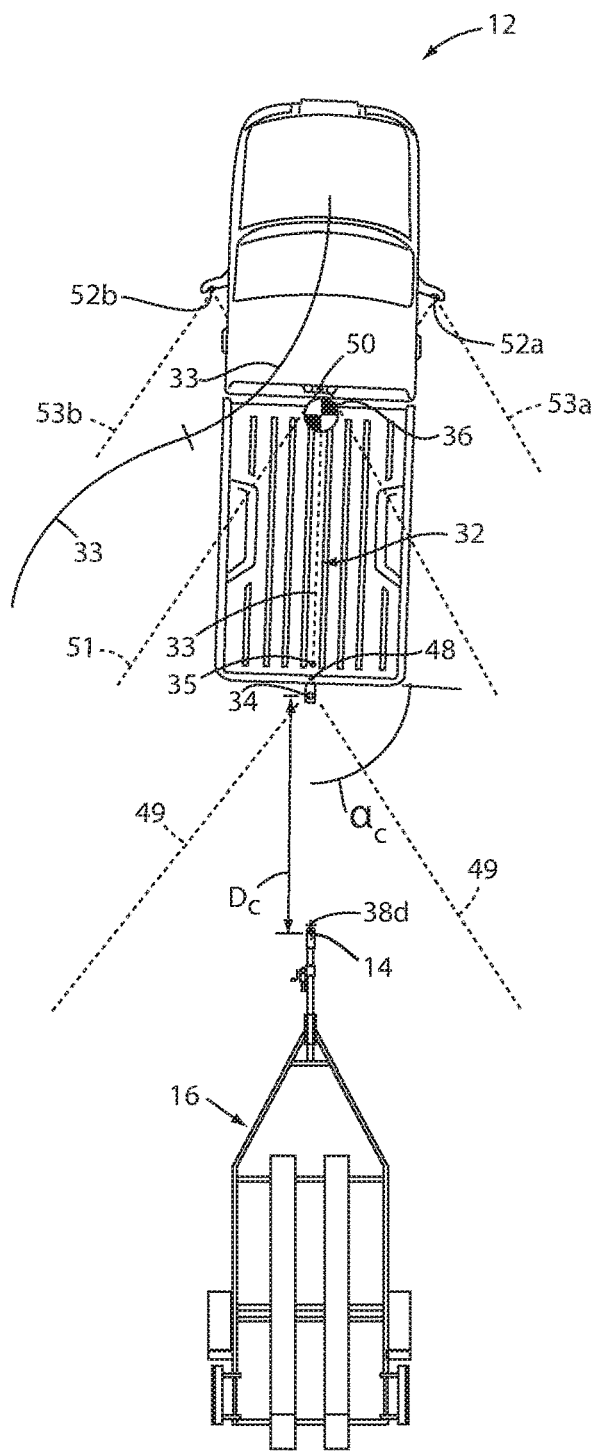
FIG. 9 is an overhead schematic view of the vehicle during a subsequent step of the alignment sequence with the trailer.
Figure 10:
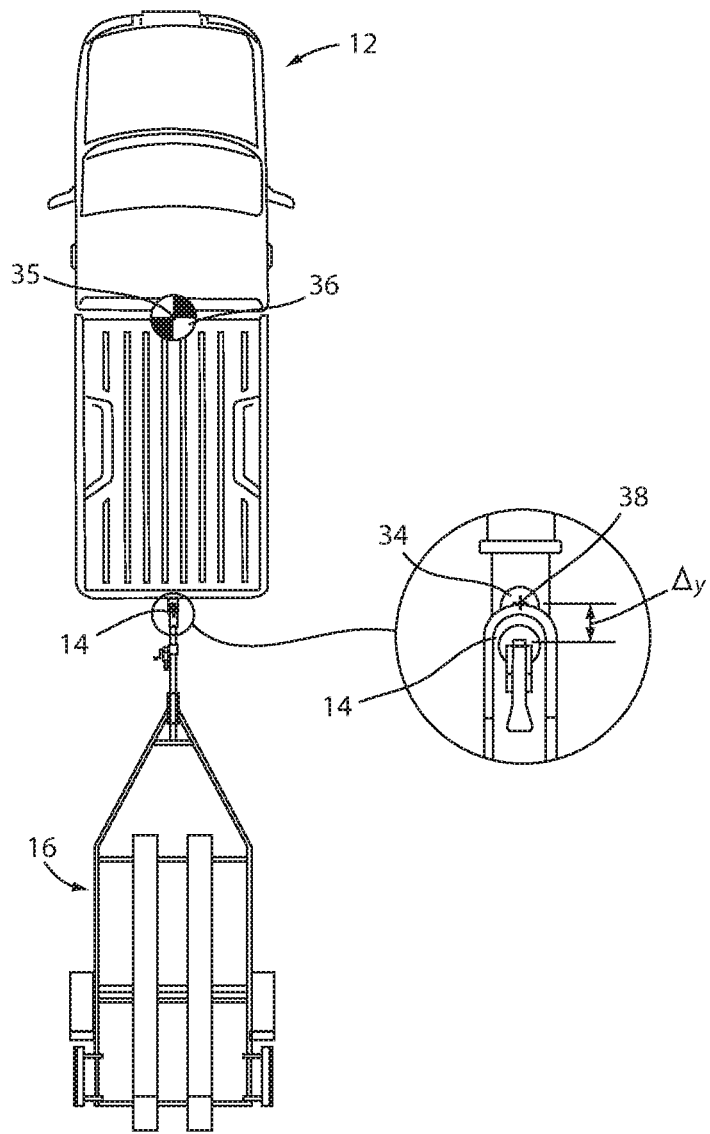
FIG. 10 is an overhead schematic view of the vehicle during a subsequent step of the alignment sequence with the trailer and showing the position of a hitch ball of the vehicle at an end of a derived alignment path.

Turning now to FIGS. 7-10, operating routine 68 may continue to guide vehicle 12 until hitch ball 34 is in the desired position $38_d$ relative to coupler 14 for coupler 14 to engage with hitch ball 34 when coupler 14 is lowered into horizontal alignment therewith. In the example discussed above, image processing routine 64 continuously monitors the positioning $D_c$, $\alpha_c$ of coupler 14 during execution of operating routine 68, including as coupler 14 comes into clearer view of rear camera 48, as shown in FIG. 8, with continued movement of vehicle 12 along path 33, as shown in FIG. 7. As discussed above, the position of vehicle 12 can also be monitored by dead reckoning device 24 with the position 28 of coupler 14 14 being continuously updated and fed into path derivation routine 66 in case path 32 and or endpoint 35 can be refined or should be updated (due to, for example, improved height $H_c$, distance $D_c$, or offset angle $\alpha_c$ information due to closer resolution or additional image data 55), including as vehicle moves closer to trailer 16, as shown in FIG. 9. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position $38d$ thereof relative to the tracked position 28 of coupler 14, as discussed above and shown in FIG. 10.

Figure 11:
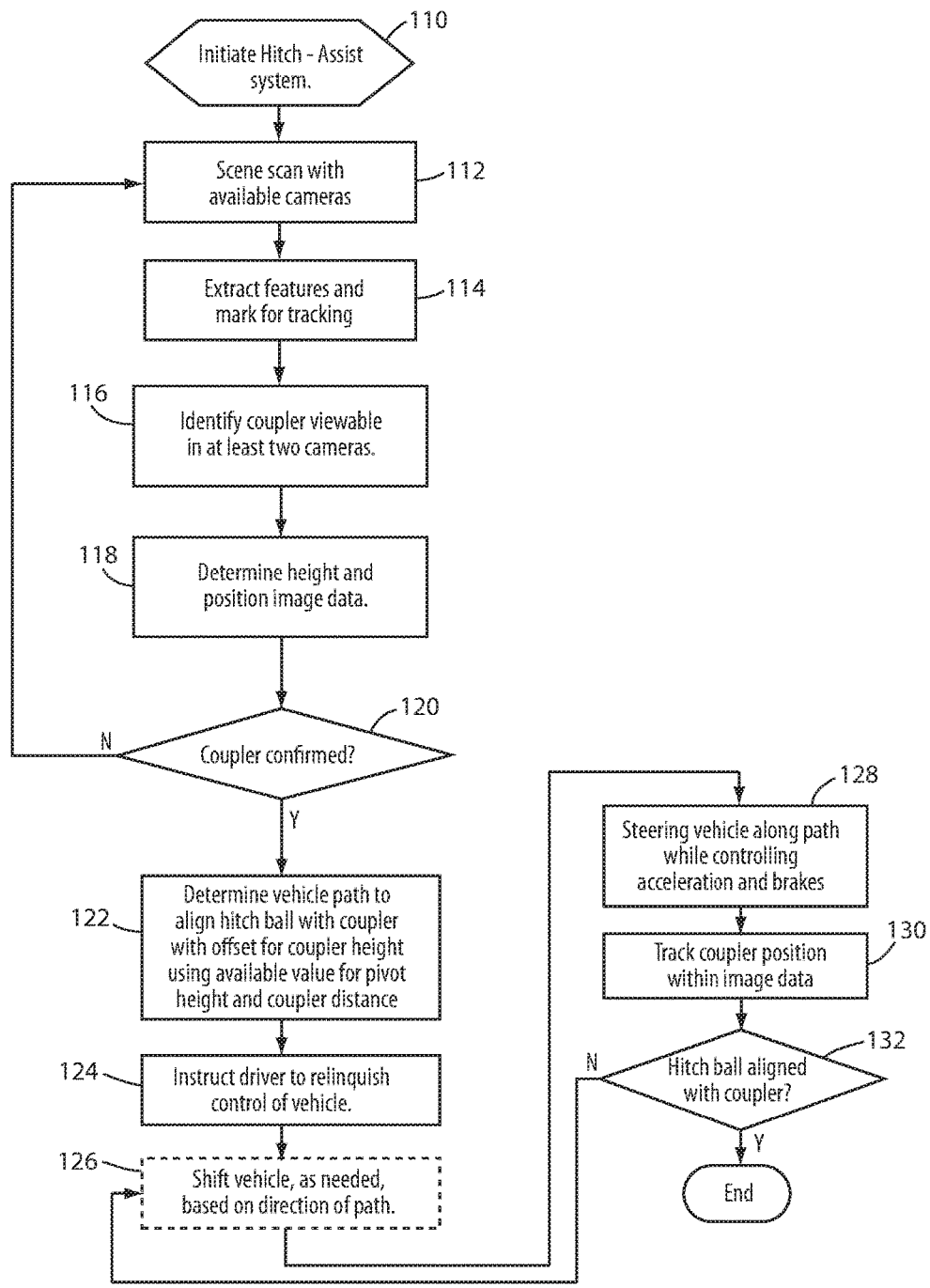
FIG. 11 is a flowchart depicting steps in the alignment sequence.

Turning now to FIG. 11, a flowchart showing steps in using hitch assist system 10 to align a vehicle hitch ball 34 with a trailer coupler 14 is shown. In particular, in step 110, the hitch assist system 10 is initiated. In an example, hitch assist system 10 can be initiated at any point when coupler 14 is in the field of view 49, 51, 53a, 53b of at least one camera 48, 50, 52a, 52b within imaging system 18. Accordingly, once the hitch assist system 10 is initiated, controller 26 can use imaging system 18 to scan the viewable scene using any or all available cameras 48, 50, 52a, 52b (step 112). The scene scan (step 112) can be used to then identify coupler 14 and, optionally, the associated trailer, which may be confirmed by the user (step 118). The height $H_c$, distance $D_c$, and offset angle $\alpha_c$ of coupler 14, as identified in step 116, can then be determined using the available image data 55 (step 120) as discussed above, including using image processing routine 64. As discussed above, image processing routine 64 can be programmed or otherwise configured to identify coupler 14 of trailer 16 within image data 55 (step 116). In this manner, after the results of the initial scene scan (step 112) are analyzed (steps 114-118), controller 26 can determine if coupler 14 has been confirmed by the user (such as by way of HMI 40) in step 120). If coupler 14 has not been confirmed or if a determined coupler 14 has been rejected, the scene scan (step 112) can be continued, including while instructing driver to move vehicle 12 to better align with trailer 16, until coupler 14 is identified. When coupler 14 has been identified and confirmed, the path derivation routine 66 can be used to determine the vehicle path 32 to align hitch ball 34 with coupler 14 in step 122. In this manner, the positioning $D_h$, $\alpha_h$ of coupler 14 is used to place the coupler 14 within the stored data relating the image coordinates with the real-world coordinates of the area surrounding vehicle 12. In doing so, controller 26 uses path derivation routine 66 to determine path 32 to align hitch ball 34 with the predicted position 28 of coupler 14 when lowered, if necessary, to an engaging position over hitch ball 34, as described above with respect to FIGS. 3-10.

Once the path 32 has been derived, hitch assist system 10 can ask the user U to relinquish control of at least the steering wheel of vehicle 12 (and, optionally, the throttle 73 and brake, in the implementation of hitch assist system 10 described above wherein controller 26 assumes control of powertrain control system 72 and brake control system 70 during execution of operating routine 68) (step 124). When it has been confirmed that user U is not attempting to control steering system 20 (for example, using torque sensor 80, as discussed above), controller 26 begins to move vehicle 12 along the determined path 32. In a system 10 that includes the capablility for forward driving and/or gear shifting, system 10 may determine if transmission system 92 is in the correct gear and, if necessary either causes transmission system 92 to shift to the desired gear or prompt the user U to shift to the desired gear (step 126). Hitch assist system 10 then controls steering system 20 (step 128) to maintain vehicle 12 along path 32 as either user U or controller 26 controls the velocity of vehicle 12 using powertrain control system 72 and braking control system 70. If vehicle 12 reaches an inflection point 90 in a path 32 (such as that which is shown in FIG. 3) including forward and backward driving, further shifting or prompts to shift can be carried out. As discussed above, controller 26 or the user can control at least steering system 20, while tracking the position $D_c$, $\alpha_c$ of coupler 14 (step 130) until vehicle 12 reaches endpoint 35, wherein the vehicle 12 hitch ball 34 reaches the desired position $38_d$ for the desired alignment with coupler 14 (step 140), at which point operating routine 68 can end (step 132), either by controlling brake system 70 to cause vehicle 12 to stop (which can be done progressively as vehicle 12 approaches such a point), or by issuing a command to the user to stop vehicle 12 (which can also be done progressively or by a countdown as vehicle 12 approaches the desired location) before deactivating hitch assist system 10.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle hitch assistance system, comprising:
a brake system; and
a controller:
acquiring position data for a coupler of a trailer;
deriving a vehicle path to align a hitch ball of the vehicle with the coupler including an end of the vehicle path compensating for a determined change in the position of the coupler in a driving direction based on the position data related to a vertical position of the coupler by relating the change in position of the coupler in a vertical direction to the change in a position of the coupler in the driving direction as a matter of rotation about an axis; and
controlling the brake system to stop the vehicle at the end of the path.

2. The system of claim 1, further including means for acquiring the position data for the coupler of the trailer.

3. The system of claim 2, wherein the means for acquiring include one or more cameras mounted on the vehicle.

4. The system of claim 1, wherein the controller determines a delta in the position of the coupler in a vertical direction to align with the hitch ball of the vehicle.

5. The system of claim 4, wherein the driving direction is on a plane generally normal to the vertical direction.

6. The system of claim 1, wherein the axis is vertically aligned with a single axle of the trailer.

7. The system of claim 1, wherein relating the change in the position of the coupler in the vertical direction to the change in the position of the coupler in the driving direction as a matter of rotation of the coupler about the axis is based on stored information including a distance between the coupler and the axis.

8. The system of claim 7, wherein the controller obtains the information including a distance between the coupler and the axis by user input.

9. The system of claim 7, wherein the controller estimates the distance between the coupler and the axis based on measured dynamics during driving when the vehicle is coupled with the trailer.

10. The system of claim 7, wherein the distance between the coupler and the axis is stored as a general estimate.

11. The system of claim 1, further including a steering system, wherein:
the controller further controls the steering system to guide the vehicle along the path.

12. A vehicle, comprising:
a brake system;
a hitch ball mounted on an exterior of the vehicle; and
a controller:
acquiring position data of a coupler of a trailer;
deriving a vehicle path to align the hitch ball with the coupler including an end of the vehicle path compensating for a determined change in a position of the coupler in a driving direction based on the position data related to a vertical position of the coupler by relating the change in the position of the coupler in a vertical direction to a change in the position of the coupler in the driving direction as a matter of rotation about an axis; and
controlling the brake system to stop the vehicle at the end of the path.

13. The vehicle of claim 12, further comprising:
a steering system;
wherein:
the controller further controls the steering system to guide the vehicle along the path.

14. The vehicle of claim 12, further comprising an imaging system including one or more cameras mounted on the vehicle; wherein:
the controller acquires the position data of the coupler by processing data received from the imaging system.

15. The vehicle of claim 12, wherein the controller determines a delta in the position of the coupler in the vertical direction to align with the hitch ball of the vehicle.

16. A method for assisting a vehicle in hitching with a trailer, comprising:
   acquiring position data for a coupler of the trailer;
   deriving a vehicle path to align a hitch ball of the vehicle with the coupler including an end of the vehicle path compensating for a change in a position of the coupler in a driving direction based on the change in position of the coupler in a vertical direction to the change in the position of the coupler in the driving direction as a matter of rotation of the coupler about an axis; and
   controlling a brake system of the vehicle to stop the vehicle at the end of the path.

17. The method of claim 16, further including:
   controlling a vehicle steering system to guide the vehicle along the path; and
   controlling a vehicle brake system to stop the vehicle at an end of the vehicle path to compensate for the determined change in the position of the coupler in the driving direction related to the difference between the vertical position of the coupler in the position data and the height of the hitch ball.

18. The method of claim 16, further comprising acquiring the position data of the coupler by processing data received from a vehicle imaging system; wherein:
   deriving the vehicle path further includes determining a delta in the position of the coupler in the vertical direction to align with the hitch ball of the vehicle.

19. The method of claim 16, further including controlling a steering system of the vehicle to guide the vehicle along the path.

* * * * *